United States Patent [19]

Pursell

[11] Patent Number: 4,479,712
[45] Date of Patent: Oct. 30, 1984

[54] APPARATUS AND METHOD FOR PRODUCING A SELECTED ENLARGEMENT OF A GRAPHIC IMAGE

[75] Inventor: Kenneth D. Pursell, Goleta, Calif.

[73] Assignee: Prof. Bloodgood's Photographic Emporium, Inc., Santa Barbara, Calif.

[21] Appl. No.: 412,216

[22] Filed: Aug. 27, 1982

[51] Int. Cl.³ .............................................. G03B 27/52
[52] U.S. Cl. ......................................... 355/55; 355/63
[58] Field of Search ......................... 355/55, 56, 18, 63

[56] References Cited

U.S. PATENT DOCUMENTS

| | | | |
|---|---|---|---|
| 1,103,342 | 7/1914 | Becker | 355/56 |
| 2,786,384 | 3/1957 | Guppy | 355/56 |
| 3,832,058 | 8/1974 | Gusovius | 355/56 |
| 3,989,373 | 11/1976 | Craig | 355/56 |
| 4,220,410 | 9/1980 | Bloodgood | 355/18 |

FOREIGN PATENT DOCUMENTS

| | | | |
|---|---|---|---|
| 610486 | 9/1932 | Fed. Rep. of Germany | 355/56 |
| 9217 | 4/1897 | United Kingdom | 355/55 |
| 238294 | 8/1925 | United Kingdom | 355/56 |

Primary Examiner—Monroe H. Hayes
Attorney, Agent, or Firm—Daniel J. Meaney, Jr.

[57] ABSTRACT

Apparatus for producing an enlargement of a graphic image including a light tight housing having an extended hollowed out central area and a light tight aperture located at one end thereof which is adapted to receive and pass a graphic image to be enlarged to a predetermined location along the center axis of and at one end of the hollowed out housing, a lens shroud including a planar lens support having a fixed focal length lens located in the center thereof and sidewalls extending therefrom and positioned with the fixed focal lens located adjacent the predetermined location and wherein the lens shroud is moveable within the hollowed out central area over a preselected distance to position the fixed focal length lens at any location within the preselected distance and in alignment with the predetermined location, a gantry housing, including sidewalls for defining a passageway which terminates in an opening at one end thereof and a planar matt support at the other end thereof wherein the gantry housing is moveably located within the hollowed out central area and in slideable light tight sealing engagement with the housing and with the opening thereof located in slideable light sealing engagement with the lens shroud sidewalls enabling the lens shroud and gantry housing to be moved towards and away from each other and to the housing and wherein the planar mat support located at the other end of the passage way is adapted to receive and position a strip of material having a base material with a coated surface thereon and wherein the gantry housing is moveable within a second preselected distance to position the planar mat support at any location within the second preselected distance in alignment with the predetermined location and a differential operating mechanism which is operatively coupled to the lens shroud and to the gantry housing for selectively moving the same towards and away from each other enabling the lens to focus an image of a graphic image located at the predetermined location onto the planar mat surface is shown.

17 Claims, 11 Drawing Figures

APPARATUS AND METHOD FOR PRODUCING A SELECTED ENLARGEMENT OF A GRAPHIC IMAGE

BACKGROUND OF THE INVENTION

1. Field of the Invention

This invention relates to an improved apparatus having a light tight housing for making a predetermined enlargement of a graphic image. Specifically, the apparatus and method of the present invention utilizes a lens shroud having a fixed focal lengths lens and a gantry means for supporting a planar mat support wherein the lens and planar mat support are selectively differentially moveable relative to the predetermined location containing a graphic image so as to produce enlargements of a graphical image wherein the enlargement size is selected and determined by the position of a fixed focal length lens relative to the graphic image and the position of the planar mat support having a sensitized piece of photographic paper relative to the lens. This invention has application for use in a diffusion transfer photographic process wherein an exposed sensitized sheet of material can be developed and processed by use of the diffusion transfer technique to produce a developed large graphic image.

2. Disclosure of the Prior Art

Apparatus and method for producing an enlargement of a graphic image is well known in the art. One such apparatus and method is disclosed in U.S. Pat. No. 4,220,410 which is assigned to the same assignee as the present invention.

Other devices are well known in the art for producing selected enlargement of an image by controlling the position of a lens relative to the graphic image and the position of a light sensitive material relative to the lens.

The known prior devices specifically require that the lens be positioned in a selected location, that the print plane surface be positioned at a specific location and the exposure time is adjusted dependent on the relative position of the lens and the print plane relative to the graphic image.

Typically, the illuminating means for exposing the image onto the sensitized sheet is in the form of an incandescent lamp or other similar illumination source for producing the desired actinic radiation at a selected wavelength.

Other known enlargement apparatus are described in U.S. Pat. Nos. 450,475; 1,527,883; 1,994,091; 2,484,048; 3,540,807 and 3,322,029.

Each of the prior art devices utilize two mechanical changes, namely change of lens position or change of the sensitized material holder to control the size of enlargement, or if appropriate, reduction.

SUMMARY OF THE INVENTION

The present apparatus and method produces a unique, novel and improved apparatus and method which permits positioning of the lens and print plane surface at selected positions relative to a predetermined location such that a wide range of enlargements can be obtained depending on the distance between the fixed focal length lens and print plane surface relative to the graphic image.

In the preferred embodiment, the apparatus for producing an enlargement of a graphic image has a light tight housing having an extending hollowed out central area and a light tight aperture located at one end thereof which is adapted to receive and pass a graphic image to be enlarged. The graphic image may be inserted through the aperture by means of a carrier slide to a predetermined location along the center axis of and located at one end of the hollowed out central area. The apparatus includes a lens shroud which includes means for defining a planar lens support having a fixed focal length lens at the control thereof. The lens shroud includes sidewalls which extend from the planar lens support forming a central cavity on one side of the fixed focal length lens. The lens shroud and the fixed focal length lens are moveably located within the hollowed out central area with the fixed focal length lens located adjacent the predetermined location. The central cavity, defined by the lens shroud sidewalls, is positioned towards the other end of the hollowed out central area. The lens shroud is moveable within the hollowed out central area over a preselected distance to position the fixed focal length lens and any location within the preselected distance and in alignment with the predetermined location adapted to receive the graphic image. The lens has a focal length at least equal to the preselected distance.

The apparatus further includes a gantry housing which includes sidewalls for defining a passageway which terminates in an opening at one end thereof and a planar mat support at the other end thereof. The gantry housing is positioned within the hollowed out central area and moveable within the housing with the opening located in slideable light sealing engagement with the lens shroud sidewalls. This light sealing engagement enables the lens shroud and the gantry housing to be moved towards and away from each other and moveable relative to the housing. The planar mat support is located at the other end of the passageway and is adapted to receive and position a strip of material having a base material with a coated surface thereon. The coated surface is responsive to a predetermined quantity of selected actinic radiation to produce an image. The gantry housing is moveable within a second preselected distance to position the planar mat support at any location within the second preselected distance and in alignment with the predetermined location adapted to receive the graphic image and in alignment with the lens located therebetween. The planar mat support is adapted to position the coated surface towards and in alignment with the lens. A differential adjusting means is operatively coupled to the lens shroud and to the gantry housing for selectively moving the lens shroud toward and away from the predetermined location to position the lens at a selected location within the preselected distance. The differential adjusting means also selectively moves the gantry housing toward and away from the predetermined location and relative to the lens shroud to position the planar mat support at a selected location within the second preselected distance. Positioning of the lens relative to the image, enables the lens to focus on a large image of the graphic image located at the determined location onto the planar mat surface. The magnitude of the enlargement is determined by the distance of the lens and the predetermined location and the distance between the planar mat surface and the lens.

The present invention overcomes several of the problems associated with prior art devices. The known prior art devices require three changes in order to make a change in the size of an adjustment. In order to change the size of an enlargement in the apparatus described in U.S. Pat. No. 4,220,410, the mechanical changes require that the lens support be moved to a different slot. Also, the print plane surface, in ther terms of the planar mat support, must be moved to a different slot. In addition, the exposure time of the incandescent radiation must likewise be changed in order to compensate for the changes in distance between the lens and the planar mat surface relative to the image.

Another problem associated with the prior art is that the use of the apparatus typically uses incandescent bulbs as the actinic radiation source. In the known devices, the illumination usually comprises four 75-watt or four 100-watt bulbs. If the apparatus is utilized in a small space and is operated for several hours, the amount of heat produced by the apparatus becomes significant. If the apparatus for producing the enlargement is located in a darkroom with the processing of the sensitized paper is done, the small room is then heated by the heat produced from the incandescent lamps.

The present invention overcomes the problems associated with the known prior art devices in many respects. First, if a change in the size of an enlargement is desired, the change can be quickly and easily accomplished by movement of the differential adjusting means to adjust the lens shroud having the fixed focal length lens and adjusting the gantry housing having the planar mat surface relative to each other which automatically performs the two mechanical changes associated with the prior art devices. In addition, in the preferred embodiment, the actinic radiation source utilized a known master and slave strobe light arrangement wherein the strobe light master is triggered by a controller. The triggering of the slave strobe light is controlled by a photosensitive responsive means such that when the master strobe light is triggered, the photosensitive responsive means precisely triggers the slave strobe light.

A further advantage of the present invention is that the controller can comprise a microprocessor which includes means responsive to position detection means, such as a microswitch, for determining the position of the lens shroud and the gantry housing. The microprocessor, in response to the position signals, can determine the quantity of actinic radiation which is required to obtain the proper exposure of the coated layer on the strip of sheet of material.

Another advantage of the present invention is that the microprocessor can be utilized as a means for controlling the entire process commencing with an operator positioning the differential adjusting means to an appropriate location which automatically moves the lens shroud, including the fixed focal length lens and the gantry housing having the planar mat surface to a selected position to produce a selected enlargement size. Thereupon, the operator initiates operation of the enlarger by activating a start-button. After the start-button has been actuated, the microprocessor then takes over control of the operation, determines the amount of exposure time required, triggers the master and slave strobe lights and, when the appropriate quantity of actinic radiation is received by the coated surface, actuates and completes an "end-of-cycle" lamp advising the operator that the process is completed.

A further advantage of the present invention is that an infinite number of sizes of enlargements can be obtained by merely setting a differential adjusting means at any desired position which automatically moves the lens shroud and the gantry housing either towards or away from each other and relative to the housing the exact distance required to maintain focus at any position and to produce a selected size enlargement of the graphic image.

A still further advantage of the present invention is that the apparatus and method can be utilized for making enlargements of standard size, such as for example, 8 inch×10 inch, or 5 inch×7 inch, utilizing either a standard polaroid image or a small size polaroid image.

A still yet further advantage of the present invention is that the operator can quickly change from either an 8 inch×10 inch size to a 5 inch×7 inch size by use of a mask of appropriate dimension, which is positioned on the planar mat surface.

Another advantage of the present invention is that the microprocessor can cause the master and slave strobe light system to be triggered one or more times, as required, to secure the desired exposure and to control the charging rate of the strobe lights. As such, the operating cycle of the entire operation from the time an operator actuates the start button until the cycle has been completed, by illuminating an "end-of-cycle" lamp on the annunciator, can be programmed and controlled by a microprocessor.

A still yet further advantage of the present invention is that the differential adjusting means may comprise bell crank members, linkage members and a relatively simple three-part slide mechanism.

BRIEF DESCRIPTION OF THE DRAWING

The foregoing and other advantages and features of this invention will apparent from the following description of the preferred embodiment of the invention when considered together with the illustrations in the accompanying drawing which include the following figures:

FIGS. 5 (a) and (b) are pictorial representations of the position of one bell crank and cam member and of the lens shroud and gantry housing at the maximum displacement position, respectively;

FIGS. 6 (a) and (b) are pictorial representations of the position of one bell crank and cam member and of the lens shroud and gantry housing at an intermediate displacement position, respectively;

FIGS. 7 (a) and (b) are pictorial representations of the position of one bell crank and cam member and of the lens shroud and gantry housing at the closest displacement position, respectively.

DESCRIPTION OF THE PREFERRED EMBODIMENT

Figure 1:
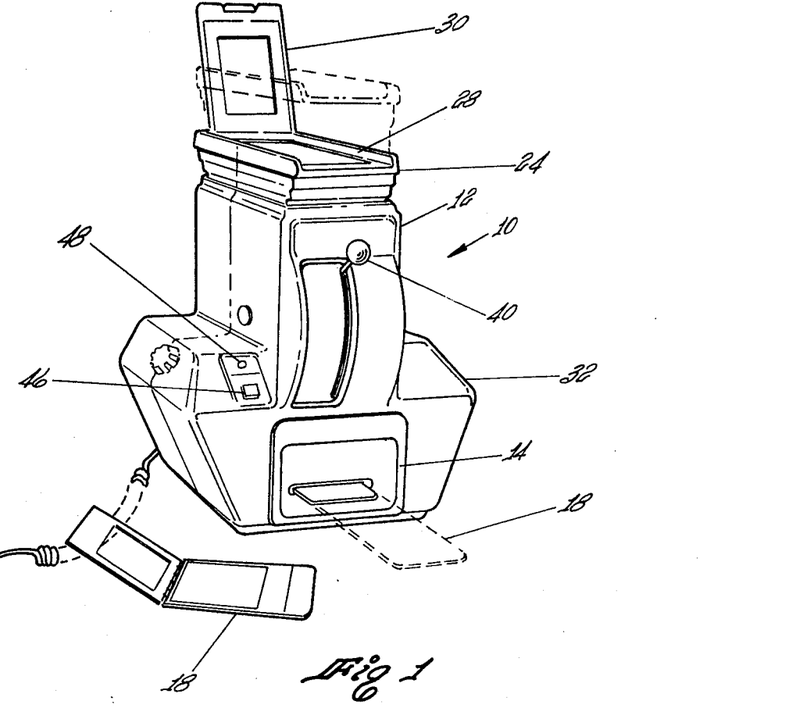
FIG. 1 is perspective view of an apparatus incorporating the teachings of this invention.
Figure 4:
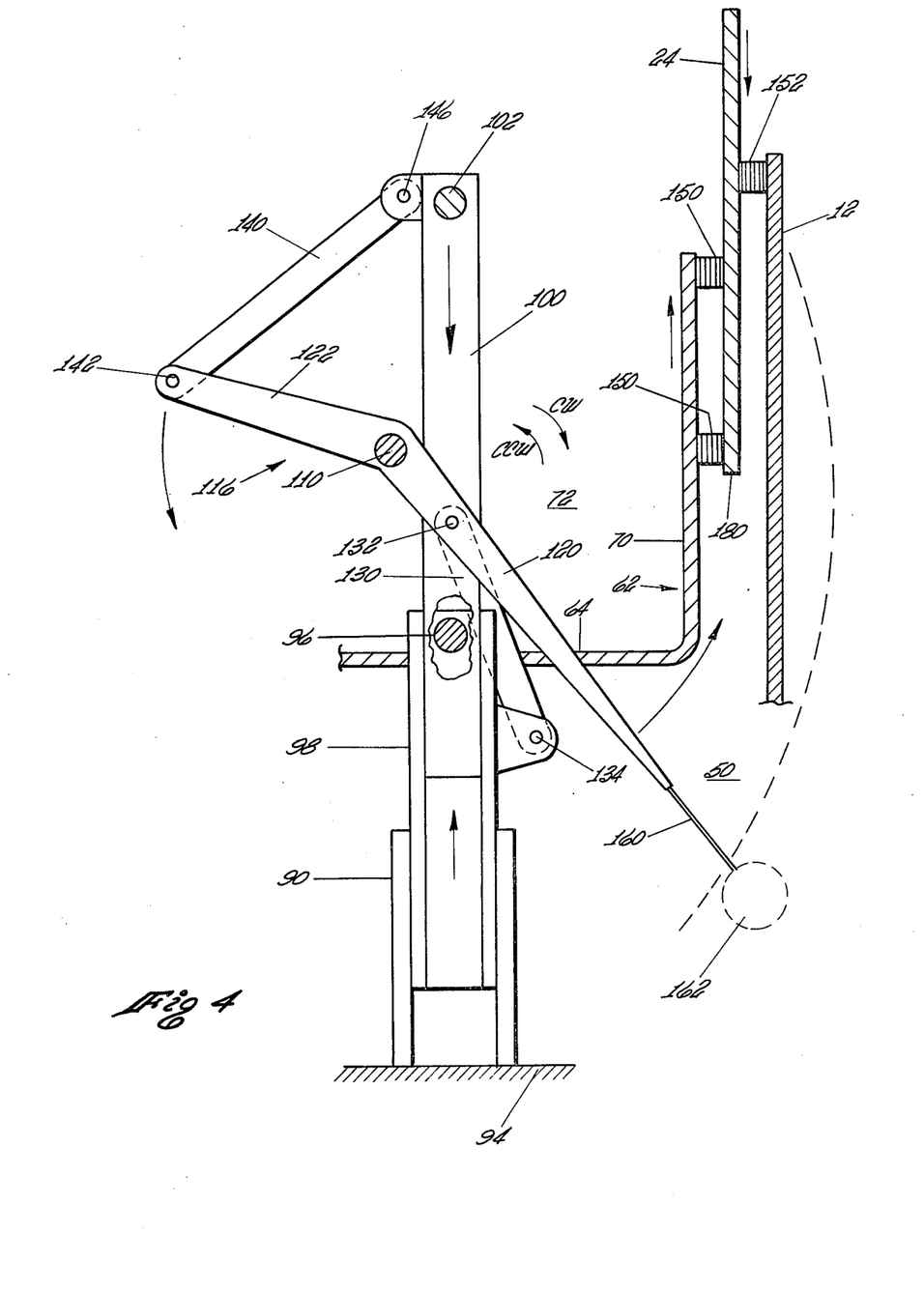
FIG. 4 is a diagrammatic orthographic representation of the differential adjusting means operatively coupled to the lens shroud, the gantry housing and the light tight housing.

FIG. 1 illustrates the preferred embodiment the apparatus for producing an enlargement of a graphic image which is shown generally by arrow 10. The apparatus 10 includes a light tight housing 12 having an extended hollowed out central area, shown in FIG. 4 as area 50, and a light tight aperture 14 located at one end of the housing 12. The aperture 14 is adapted to receive and pass a graphic image, which in the preferred embodiment is placed into a platen slide 18, to be enlarged. The platen slide 18 is adapted to be transported to a predetermined location along the center axis of and at one end of the hollowed out central area defined in the interior of the housing 12. The housing 12 encloses a lens shroud 62, in FIGS. 4, 5 (b), 6 (b) and 7 (b), which includes means defining a planar lens support 64 in the same Figures, having a fixed focal length lens 66 at the center thereof. The lens shroud 62 has a sidewall 70 extending therefrom forming a central cavity 72, as shown in FIG. 4, on one side of the fixed focal length lens 66.

A gantry housing 24 includes sidewalls for defining a passageway which terminates in an opening at one end thereof and a planar mat support receiving surface 28 at the other end thereof. The planar mat support receiving surface 28 includes a flexible, light tight covering member 30 which is adapted to hold a strip of photosensitive material having a base and a coated surface with the coated surface facing inwardly towards the gantry housing 24. Also, a mat having a smaller size opening may also be placed onto the planar mat support receiving surface 28 in order to obtain a smaller size enlargement, if desired. The planar mat support receiving surface 28 is preferably 8" by 10" to provide for an enlargement of this size. However, a mat having a smaller size, such as for example 5" by 7" or 2½" by 2½" may be used, if such a size enlargement is desired.

The gantry housing 24 is positioned within the hollowed out central area of the housing 12 and is moveable within the housing 12. A slideable light sealing engagement is maintained between the interior wall of the housing 12 defining the hollowed out central area and the exterior wall of the gantry housing 24. The planar mat support receiving surface is adapted to position the coated surface towards the interior of the housing to receive and be responsive to a predetermined quantity of selected actinic radiation to produce an image.

Figure 2:
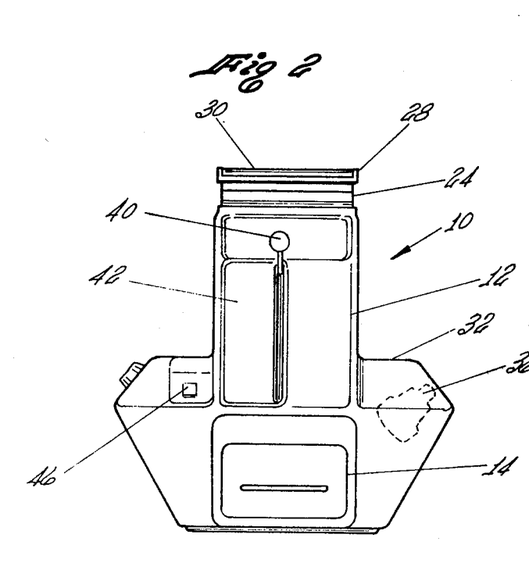
FIG. 2 is a front elevational view of the apparatus of FIG. 1.
Figure 3:
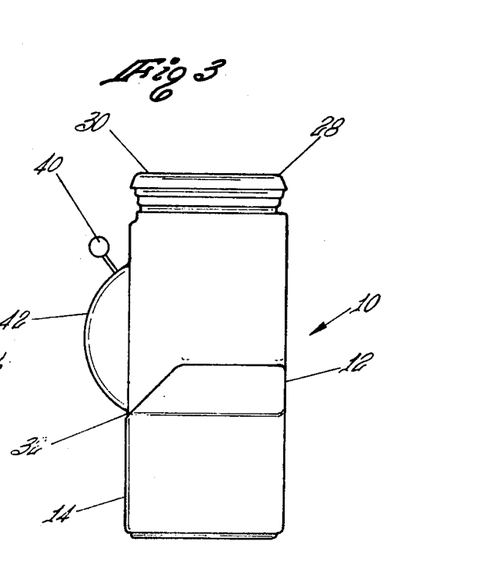
FIG. 3 is a side elevational view of the apparatus of FIG. 1.

The housing 12 includes an enlarged section 32 at the one end thereof to enclose a source of actinic radiation which, in the preferred embodiment, is a master and slave strobe lights system, shown as dashed strobe light 36 in FIG. 2, in the enlarged section 32. The master stobe is located on one side and the slave is located on the other side.

Figures 5A, 5B, 6A, 6B:
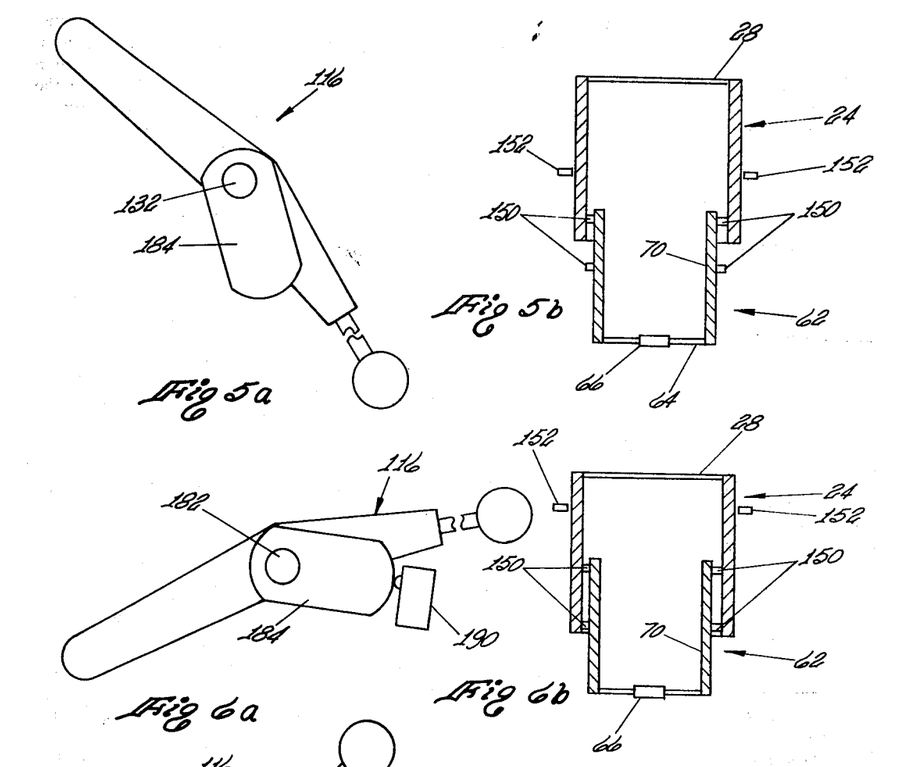

A differential adjusting means, generally illustrated as element 40, is operatively coupled to the lens shroud 62 and to the gantry housing 24 for selectively moving the lens shroud 62 towards and away from the predetermined location to position the lens at a selected location within a preselected distance within the hollowed out central area relative to the predetermined location adapted to receive the graphic image and for selectively moving the gantry housing 24 towards and away from the predetermined location and relative to the lens shroud 62 to position the planar mat support 28 at a selected location within a second preselected distance enabling the lens 66, shown in FIGS. 5 (b), 6 (b) and 7(b), to focus an enlarged image of the graphic image located at the predetermined location onto the planar mat surface 28. The magnitude of the enlargement is determined by the distance between the lens 66 and the predetermined location and the distance between the planar mat surface 28 and the lens 66. The housing 12 includes an arcuate area 42 to accomodate the differential adjusting means 40. In addition, the housing 12 encloses the controller and related circuitry, including a microprocessor, within the interior thereof and has a start button 46 which an operator actuates to initiate the exposing cycle. Prior to actuating the start button 46, the operator sets the differential adjusting means 40 at an appropriate setting which selects the size of the desired enlargement. When the method of producing the enlargement is completed, an "end-of-cycle" light 48 is illuminated by the control circuitry to advise the operator that the operating cycle is completed and that the coated surface on the photosensitive material has been imaged and is ready for developing using known developing techniques.

The operation of the differential adjusting means 40 will now be considered in reference to FIG. 4. The differential adjusting means 40 includes first and second elongated support members, and one elongated support member being shown and identified as 90, having one end thereof 92 fixedly mounted at the one end of the housing 12, the bottom portion thereof shown as 94. The first and second elongated support members, of which 90 is typical, are positioned in a spaced parallel relationship to each other. First and second elongated slide members, and one elongated support member being shown and identified as 98, has one end thereof slidedably mounted for linear movement with each of the first and second elongated support members 90 and with the other end of the first and second elongated slide members 98 being fixedly attached to the sidewall of the lens shroud 62, illustrated as connecting point 96, to move the same towards and away from the one end 94 of the housing as the first and second elongated slide members 98 are moved relative to the first and second elongated support members 90. First and second linear guide members, and one of the linear guide members being shown as 100, have one end thereof slideably mounted for linear movement in the first and second elongated slide members 98 and with the end thereof being fixedly attached to the gantry housing 24, illustrated as connecting point 102, and being adapted to move the same towards and away from the one end 94 of the housing 12 as the first and second linear guide members 100 are moved relative to the first and second elongated slide members 98.

A pair of bell cranks, of which bell crank 116 is typical, is pivotally mounted at point 110 to the housing 12 and has a centerline extending substantially normal to and spaced from the center axis of the housing 12 and is located adjacent the lens shroud 62. Each of the pair of bell cranks 116 has a first bell crank arm 120 which has a first predetermined length and a second bell crank arm 122 having a second predetermined length which is shorter than the first predetermined length. The bell crank 116 has a selected obtuse angle, an angle of about 145° being preferred, between the first bell crank arm 120 and the second bell crank 122. The bell cranks 116 are pivotedly mounted at point 110 to the housing in an aligned, spaced, parallel relationship to each other and are adapted to be rotated together.

A first pair of linkage members, of which 130 is typical, each have one end thereof pivotly mounted at point 132 on one of the first bell crank arms 120 and the other end thereof pivotedly mounted, illustrated by pivot point 134, to the first and second elongated slide members 98.

A second pair of linkage members, of which 140 is typical, each have one end thereof pivotly mounted, illustrated as pivot point 142, to the second bell crank arms 122 and the other end thereof is pivotly mounted, illustrated by pivot point 146, to the first and second elongated linear guide members 100.

In operation, when the bell cranks 116 are rotated together in a first direction, for example clockwise, the bell crank 116 is adapted to apply a force to the first pair of linkage members 130 to urge the first and second elongated slide members 98 towards and into the first and second elongated support members 90 to transport the lens shroud 62 and lens 66 toward the predetermined location of the housing 12 located in the plane of bottom 94 and to apply a force to the second pair of linkage members 140 to urge the first and second linear guide members 100 away from the first and second support members 98 to transport the gantry housing 24 away from the predetermined location. When the bell cranks 116 are rotated in a second direction, for example in a counter clockwise direction, the movement thereof is reversed to transport the lens shroud 62 and the gantry housing 24 in opposite directions. The bell crank arms 120 and 122 are responsive to the rotation of the bell cranks 116 to move the gantry housing 24 and the lens shroud 62 towards and away from each other at different rates determined by the selected lengths of each of the bell crank arms, 120 and 122, by the obtuse angle therebetween and the length of said first and second pair of linkage arms. In the preferred embodiment, the length of the first bell crank arm is 2.1 inches and the length of the second bell crank arm was 5.4 inches making the ratio of the distances thereof approximately 4.

In FIG. 4, the apparatus includes a first light sealing and guiding means 150 positioned between the outer surface of the sidewall of the lens shroud 62 and the inner surface of the gantry housing 24 defining the passageway. A second light sealing and guiding means 152 is positioned between the outer surface of the gantry housing 24 defining the passageway and the housing 12 defining the hollowed out central area 50. An extended arm 160 may be attached to the first bell crank arms 120 of both bell cranks 116 to adjust the same and may have a knob 162 attached thereto. In the preferred embodiment of the apparatus, the first elongated support 90, the first elongated slide member 98 and the said first linear guide member 100, and its associated second elongated support, second elongated slide member and second linear guide member, are each formed of a three part assembly having bearing surfaces therebetween. Such linear supporting and guiding assemblies are known in the art.

FIGS. 5 (a) and (b) illustrate diagramatically the operation of the rotation of the differential adjusting means in the maximun enlargement position. The bell crank 116 is in its lowest position which is shown in FIG. 5 (a). The lens shroud 62 and the fixed focal length lens 66 are moveably located within the hollowed out central area 50 with the fixed focal length lens 66 located adjacent the predetermined location and with its central cavity 72 positioned towards the other end of the hollowed out central area 50. The lens shroud 62 is moveable within the hollowed out central area 50 over a preselected distance to position the fixed focal length lens 66 at any location within the preselected distance and in alignment with the predetermined location adapted to receive a graphic image. The lens 66 has a focal length at least equal to the preselected distance.

As illustrated in FIG. 5 (b), the lens 66 is positioned by the lens shroud 62 at its closest position to the graphic image. The gantry housing 24 includes a sidewall for defining a passageway which terminates in an opening 180 at one end thereof and with the planar mat support receiving surface 28 at the other end thereof. The gantry housing 24 is positioned within the said hollowed out central area 50 and moveable within the housing 12 and with the opening 180 located in slideable light sealing engagement with the lens shroud 62 sidewalls, through light sealing and supporting means 150, enabling the lens shroud 62 and the gantry housing 24 to be moved towards and away from each other and moveable relative to the housing 12. The planar mat support 28 is located at the other end of the said passageway and is adapted to receive and position a strip of material having a base material with a coated surface thereon. The coated surface is responsive to a predetermined quantity of selected actinic radiation to produce an image. The gantry housing 24 is moveable within a second preselected distance to position the planar mat support at any location within the second preselected distance and in alignment with the predetermined location adapted to receive the graphic image and in alignment with the lens 66 located therebetween. In FIG. 5 (b), the gantry housing 24 is located in its maximum position away from the bottom 94 having the predetermined location for the graphical image to be reproduced. A cam member 184 is fixedly attached at point 182 to the bell crank 116 to indicated the position thereof at a selected position.

FIGS. 6 (a) and (b) show the relative positions of the same elements as in FIG. 5 (a) and 5 (b) for an intermediate position. The cam member 184 engages a microswitch 190 to produce an electrical signal representative of the position of the lens shroud 62 and the gantry housing 24.

Figure 7A:
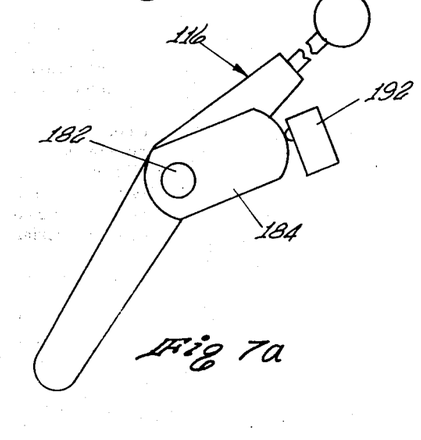
Figure 7B:
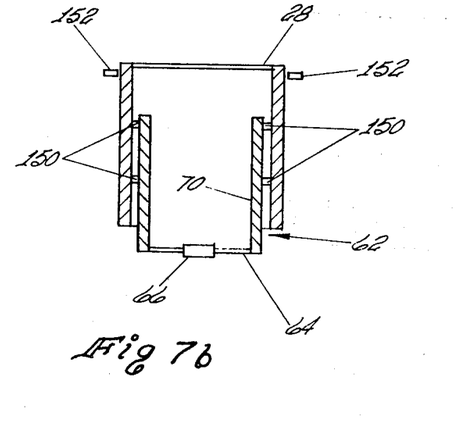

FIGS. 7 (a) and (b) show the relative positions of the same elements as in FIG. 5 (a) and 5 (b) for the minimize size enlargement. The cam member 184 engages a microswitch 192 in this position.

In essence, adjustment of the differential adjusting means causes the lens shroud 62 and the gantry means to telescope within each other as is evidenced from FIG. 5 (b), 6 (b) and 7 (b).

Figure 8:
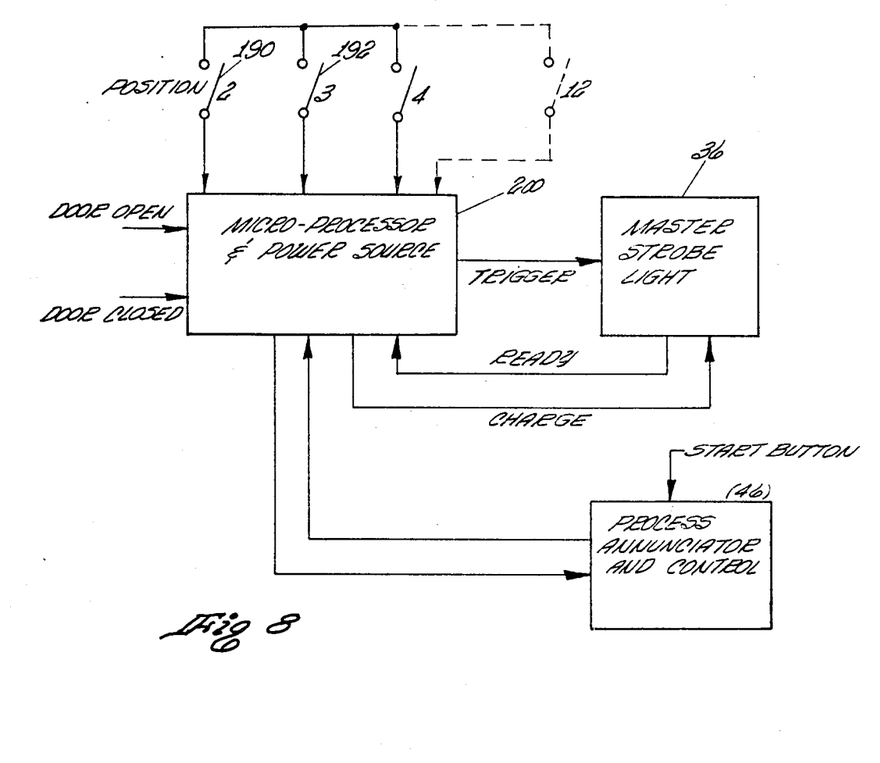
FIG. 8 is a block diagram showing the use of a microprocessor for controlling the operations of the various components of the apparatus.

FIG. 8 is a block diagram of the circuitry showing the use of a microprocessor 200 as a controller for controlling the apparatus. The microswitch 190 and 192 apply the electrical signals to the microprocessor. The other operations are noted on the block diagram. The microprocessor 200 automatically determines the quantity of actinic radiation that is required to properly expose the coated surface of a photosensitive material positioned on the planar mat receiving support. If a single operation of the strobe lights is not sufficient to expose the coated layer, then a multiple operation of the strobe lights are controlled by the microprocessor 200.

What is claimed is:

1. Apparatus for producing an enlargement of a graphic image comprising
   a light tight housing having an extended hollowed out central area and a light tight aperture located at one end thereof which is adapted to receive and pass a graphic image to be enlarged to a predetermined location along the center axis of and at said one end of said hollowed out central area;
   a lens shroud including means defining a planar lens support having a fixed focal length lens at the center thereof and sidewalls extending therefrom forming a central cavity on one side of said fixed focal length lens, said lens shroud and said fixed focal length lens being moveably located within said hollowed out central area with said fixed focal length lens located adjacent said predetermined location and said central cavity positioned towards said other end of said hollowed out central area, said lens shroud being moveable within said hollowed out central area over a preselected distance to position said fixed focal length lens at any location within said preselected distance and in alignment with the predetermined location adapted to receive a said graphic image, said lens having a focal length at least equal to said preselected distance;

a gantry housing including sidewalls for defining a passageway which terminates in an opening at one end thereof and a planar mat support at the other end thereof, said gantry housing being positioned within said hollowed out central area and moveable within said housing and with the opening located in slideable light sealing engagement with the lens shroud sidewalls enabling the lens shroud and gantry housing to be moved towards and away from each other and moveable relative to the housing, said planar mat support being located at said other end of said passageway and being adapted to receive and position a strip of material having a base material with a coated surface thereon, which coated surface is responsive to a predetermined quantity of selected actinic radiation to produce an image, said gantry housing being moveable within a second preselected distance to position said planar mat support at any location within said second preselected distance and in alignment with the predetermined location adapted to receive a said graphic image and in alignment with said lens located therebetween, said planar mat support being adapted to position the coated surface toward and in alignment with said lens; and differential adjusting means operatively coupled to said lens shroud and to said gantry housing for selectively moving said lens shroud towards and away from said predetermined location to position said lens at a selected location within said preselected distance and for selectively moving said gantry housing towards and away from said predetermined location and relative to said lens shroud to position said planar mat support at a selected location within said second preselected distance enabling said lens to focus an enlarged image of a said graphic image located at said predetermined location onto said planar mat surface, the magnitude of the enlargement being determined by the distance between the lens and the predetermined location and the distance between the planar mat surface and said lens.

2. The apparatus of claim 1 wherein said differential adjusting means includes first and second elongated support members having one end thereof fixedly mounted at said one end of said housing and positioned in a spaced parallel relationship to each other;

first and second elongated slide members having one end thereof slidedably mounted for linear movement in said first and second elongated support members and the other end of said first and second elongated slide members being fixedly attached to the sidewall of said lens shroud to move the same towards and away from said one end of the housing as said first and second elongate slide members are moved relative to said first and second elongated support members;

first and second linear guide members having one end thereof slideably mounted for linear movement in said first and second elongated slide members and with the end thereof being fixedly attached to the gantry housing and being adapted to move the same towards and away from said one end of the housing as said first and second linear guide members are moved relative to the first and second elongated slide members;

a pair of bell cranks pivotally mounted to said housing and having a centerline extending substantially normal to and spaced from the center axis of said housing adjacent said lens shroud, each of pair of bell cranks having a first bell crank arm which has a first predetermined length and a second bell crank arm having a second predetermined length which is shorter than said first predetermined length, said bell crank having a selected obtuse angle between said first bell crank arm and said second bell crank arm, said bell cranks being fixedly mounted to the housing in an aligned, spaced, parallel relationship to each other and adapted to be rotated together;

a first pair of linkage members each having one end thereof pivotly mounted on one of said first bell crank arms and the other end thereof pivotedly mounted to said first and second elongated slide members; and a second pair of linkage members each having one end thereof pivotly mounted to said second bell crank arms and the other end thereof pivotly mounted to said first and second elongated linear guide members;

said bell cranks when being rotated in a first direction being adapted to apply a force to the first pair of linkage member to urge said first and second elongated slide members towards and into said first and second elongated support members to transport said lens shroud and lens toward said predetermined location and to apply a force to the second pair of linkage members to urge said first and second elongated guide members away from said first and second support members to transport the gantry housing away from said predetermined location and when said bell cranks are rotated in a second direction the movement thereof is reversed to transport said lens shroud and said gantry housing in opposite directions, said bell crank arms being adapted to move said gantry housing and said lens shroud towards and away from each other at different rates determined by the selected lengths of each of said bell crank arms, by the angle therebetween and the length of said first and second pair of linkage arms.

3. The apparatus of claim 1 further comprising controller means positioned adjacent said predetermined location for controllably illuminating a said graphic image with an actinic radiation at a selected wavelength which is adapted to be focused by said lens onto a said coated surface to produce an exposed, enlarged graphic image on a said coated surface of the graphic image positioned in a predetermined location.

4. The apparatus of claim 1 further comprising
a position responsive means including means operatively coupled to said bell cranks for determining the relative position of said lens relative to said predetermined location and said planar mat surface relative to said predetermined location and producing and electrical signal representative of the position thereof; and wherein said illuminating control means includes
an actinic radiation control means which is responsive to the electrical signal representing the position of said lens and said planar mat surface relative to a predetermined location for selectively controlling the quantity of actinic radiation at a said selected wave length which is focused by said lens onto a said coated surface.

5. The apparatus of claim 4 further comprising
a master strobe light and slave strobe light being located in a spaced relationship at said one end of said housing and operatively coupled to and controlled by said actinic radiation control means.

6. The apparatus of claim 6 further comprising
a first light sealing and guiding means positioned between the outer surface of said sidewall of said lens shroud and the inner surface of the gantry housing defining the passageway.

7. The apparatus of claim 6 further comprising
a second light sealing and guiding means positioned between the outer surface of the gantry housing defining the passageway and the housing defining the hollowed out central area.

8. The apparatus of claim 2 further wherein the obtuse angle is approximately 145°.

9. The apparatus of claim 2 wherein the ratio between the distance from the center of the bell crank to the center of the pivotly mounted first end of the first pair of linkage members and the distance from the center of the bell crank to the center of the pivotly mounted first end of the second pair of linkage members is about 0.4.

10. The apparatus of claim 2 wherein said first elongated support, said first elongated slide member and said first linear guide member and said second elongated support, said second elongated slide member and said second linear guide members are each formed of a three part assembly having bearing surfaces therebetween.

11. The apparatus of claim 3 wherein said controller means is a microprocessor.

12. Apparatus for producing an enlargement of a graphic image comprising
a light tight housing means including means defining a hollowed out central area and a predetermined location at said one end of said hollowed out central area to receive a graphic image to be enlarged;
a lens shroud including means defining a planar lens support having a fixed focal length lens at the center thereof and a sidewall extending in one direction from said fixed focal length lens;
a gantry housing including sidewalls for defining a passageway which terminates in an opening at one end thereof and a planar mat receiving surface at the other end thereof, said gantry housing being mounted in a telescoping arrangement for movement relative to said lens shroud by said sidewall of the lens shroud being moveable through a light tight seal relative to the opening of said gantry housing;

differential adjusting means operatively coupled to said lens shroud and to said gantry housing for selectively moving said lens shroud towards and away from said predetermined location to position said lens at a selected location within said preselected distance and for selectively moving said gantry housing towards and away from said predetermined location and relative to said lens shroud to position said planar mat support at a selected location within said second preselected distance enabling said lens to focus an enlarged image of a said graphic image located at said predetermined location onto said planar mat surface, the magnitude of the enlargement being determined by the distance between the lens and the predetermined location and the distance between the planar mat surface and said lens; and
means positioned adjacent said predetermined location for controllably illuminating a said graphic image with an actinic radiation at a selected wavelength which is adapted to be focused by said lens onto said planar mat receiving surface.

13. The apparatus of claim 12 wherein said differential adjusting means includes
first and second elongated support members having one end thereof fixedly mounted at said one end of said housing and positioned in a spaced parallel relationship to each other;
first and second elongated slide members having one end thereof slidedably mounted for linear movement in said first and second elongated support members and the other end of said first and second elongated slide members being fixedly attached to the sidewall of said lens shroud to move the same towards and away from said one end of the housing as said first and second elongate slide members are moved relative to said first and second elongated support members;
first and second linear guide members having one end thereof slideably mounted for linear movement in said first and second elongated slide members and with the end thereof being fixedly attached to the gantry housing and being adapted to move the same towards and away from said one end of the housing as said first and second linear guide members are moved relative to the first and second elongated slide members;
a pair of bell cranks pivotally mounted to said housing and having a centerline extending substantially normal to and spaced from the center axis of said housing adjacent said lens shroud, each of pair of bell cranks having a first bell crank arm which has a first predetermined length and a second bell crank arm having a second predetermined length which is shorter than said first predetermined length, said bell crank having a selected obtuse angle between said first bell crank arm and said second bell crank arm, said bell cranks being fixedly mounted to the housing in an aligned, spaced, parallel relationship to each other and adapted to be rotated together;
a first pair of linkage members each having one end thereof pivotly mounted on one of said first bell crank arms and the other end thereof pivotedly mounted to said first and second elongated slide members; and
a second pair of linkage members each having one end thereof pivotly mounted to said second bell crank arms and the other end thereof pivotly mounted to said first and second elongated linear guide members;

said bell cranks when being rotated in a first direction being adapted to apply a force to the first pair of linkage member to urge said first and second elongated slide members towards and into said first and second elongated support members to transport said lens shroud and lens toward said predetermined location and to apply a force to the second pair of linkage members to urge said first and second elongated guide members away from said first and second support members to transport the gantry housing away from said predetermined location and when said bell cranks are rotated in a second direction the movement thereof is reversed to transport said lens shroud and said gantry housing in opposite directions, said bell crank arms being adapted to move said gantry housing and said lens shroud towards and away from each other at different rates determined by the selected lengths of each of said bell crank arms, by the angle therebetween and the length of said first and second pair of linkage arms.

14. A method for producing an enlargement of a graphic image using a light tight housing comprising the steps of inserting through a light tight passageway in the light tight housing a graphic image to be enlarged for positioning the same at a predetermined location in one end of the light tight housing;

placing a sheet of material having a sensitized surface onto a planar mat support receiving surface located on a gantry housing at the other end of the light tight housing with the sensitized surface positioned toward said planar mat support receiving surface;

concurrently adjusting with an adjusting member of a differential adjusting means, wherein the adjusting member extends from the interior of the light tight housing to the exterior thereof, the position of a lens shroud having a fixed focal length lens relative to said graphic image and the position of the gantry housing having the planar mat surface relative to said lens and said graphic image to focus the image onto said planar mat surface and the sensitized surface of the sheet of material at a selected enlargement ratio of a plurality thereof; and exposing the graphic image to a selected quantity of actinic radiation capable of forming a developable image on the sensitized surface of the sheet of material.

15. The method of claim 14 further comprising the step of placing a light tight covering member onto the back of a sheet of material having on the front thereof the sensitized surface which is sensitive to said actinic radiation.

16. The method of claim 15 further comprising the step of placing the graphic image to be enlarged into a platen holder and inserting the same through the light tight passageway into the light tight housing and into said predetermined location.

17. The method of claim 14 further comprising the step of controlling with a controlling means the time of exposing the graphic image to a selected quantity of actinic radiation as a function of the position of the differential adjustment means relative to the planar mat surface and the position of a graphic image to be enlarged.

* * * * *